(12) United States Patent  (10) Patent No.: US 8,342,146 B2
Schuler et al. (45) Date of Patent: Jan. 1, 2013

(54) CAMSHAFT AND PRODUCTION PROCESS THEREFOR

(75) Inventors: Markus Schuler, Oberwolfach (DE); Renald Kuempel, Steinach (DE)

(73) Assignee: Neumayer Tekfor Holding GmbH, Hausach (DE)

( * ) Notice: Subject to any disclaimer, the term of this patent is extended or adjusted under 35 U.S.C. 154(b) by 443 days.

(21) Appl. No.: 12/608,398

(22) Filed: Oct. 29, 2009

(65) Prior Publication Data

US 2010/0162976 A1 Jul. 1, 2010

Related U.S. Application Data

(60) Provisional application No. 61/181,081, filed on May 26, 2009.

(30) Foreign Application Priority Data

Oct. 29, 2008 (DE) .......................... 10 2008 053 723

(51) Int. Cl.
*F01L 1/04* (2006.01)

(52) U.S. Cl. ..................... 123/90.6; 123/90.44; 29/888.1
(58) Field of Classification Search ................. 123/90.6, 123/90.44; 29/888.1
See application file for complete search history.

(56) References Cited

U.S. PATENT DOCUMENTS 2,888,837 A * 6/1959 Hellmann .................... 74/568 R
6,725,818 B2 * 4/2004 Methley ..................... 123/90.27

* cited by examiner

*Primary Examiner* — Ching Chang
(74) *Attorney, Agent, or Firm* — Crowell & Moring LLP

(57) ABSTRACT

A camshaft assembly, particularly for use in an internal combustion engine, having a shaft base body and a plurality of cam parts. In order to be able to selectively shut down individual cylinders, cam parts are provided with cams which are arranged so as to be rotationally fixed and axially displaceable in relation to the shaft base body. Depending on a desired sequence of axially fixed and axially displaceable cam parts, it is proposed to arrange the axially displaceable cam parts on a longitudinally extending profile in an axially displaceable manner and to push the axially fixed cam parts—insofar as these are necesary—over or across the receiving area for the axially displaceable cam parts and to secure them to the shaft.

6 Claims, 2 Drawing Sheets

CAMSHAFT AND PRODUCTION PROCESS THEREFOR

CROSS REFERENCE TO RELATED APPLICATIONS

This application claims priority from U.S. provisional patent application No. 61/181,081, filed May 26, 2009, the entire disclosure of which is incorporated herein by reference. Priority is also claimed based on Federal Republic of Germany patent application no. DE 10 2008 053 723.3, filed Oct. 29, 2008.

BACKGROUND OF THE INVENTION

The invention relates to a camshaft with axially fixed and axially displaceable cam parts.

Such camshafts are particularly well-known from internal combustion engines in which the gas exchange of combustion cylinders is controlled by cam parts, which are arranged on the camshaft and axially actuate spring-loaded inlet and outlet valves. Depending on the number of valves, the cam parts have corresponding cams which act on the individual valves when the camshaft rotates. To this end, two camshafts act in modern internal combustion engines, one controlling the outlet valves and the other the inlet valves, or a plurality of camshafts controls both inlet and outlet valves.

To save fuel, it may be provided that individual cylinders of the engine are shut down under certain operating conditions of a motor vehicle, such as when idling, when operating at partial load or while coasting. To this end, particular valves should selectively remain unactuated, that is, closed, whereas the remaining valves retain their function. For this, it is known to axially displace cam parts using an actuator, wherein axially fixed and axially displaceable cam parts can alternate, depending on the timing sequence of the individual cylinders and the cylinders chosen for shutdown.

SUMMARY OF THE INVENTION

The object of the invention is to propose a camshaft and a method for its manufacture that permits an alternating arrangement of axially fixed and axially displaceable cam parts.

The object is achieved by a camshaft, particularly for use in an internal combustion engine, having a rotatably mounted shaft base body and a plurality of cam parts, each having an opening for its reception on the shaft base body, wherein at least one cam part is received so as to be rotationally fixed and axially displaceable on a longitudinal profile and at least one cam part, which is to be arranged axially fixed during assembly, is to be pushed across at least one receiving area for an axially displaceable cam part and then secured. A camshaft configured in this manner furthermore solves the problem of arranging axially fixed cam parts and cam parts that are displaceable along a longitudinal profile into different positions of the shaft base body, wherein axially displaceable and axially fixed cam parts each must be brought across the receiving area of another cam part. This should achieve a large number of identical parts.

The camshaft can be used to control the inlet and or the outlet valves. An internal combustion engine can therefore be equipped with a plurality of camshafts according to the proposed principle, for example an internal combustion engine having cylinders arranged V-shaped having four camshafts according to the invention. The shaft base body is preferably a solid shaft or a hollow shaft or a tubular section, wherein the cam parts preferably have a single opening for their reception on the shaft base body. A preferably finished shaft end piece, which contains drive elements for the camshaft for example, can be attached before or after the attachment of the cam parts.

The invention also comprises other assembly parts of the camshaft, which can be prepared and secured in correspondence with the cam parts. These assembly parts are understood to possibly include bearing rings, pump cams for driving pumps, such as oil, water or fuel pumps, sensor wheels for detecting the camshaft speed, drive wheels for driving the camshaft between the ends of the camshaft, aligning rings and/or the like. To this end, the assembly parts can be provided between two secured cam parts, two axially displaceable cam parts, between a secured and an axially displaceable cam part and/or between a shaft end piece and a secured or axially displaceable cam part.

To act upon a plurality of valves of a cylinder, the secured cam parts, which are secured to the shaft base body separately and axially spaced or which are secured to a part attached to the shaft base body, can particularly be configured as single cam parts, each acting upon one valve. A bearing ring and/or another assembly part can be secured between these types of cam parts. The plurality of cams is advantageously configured as a modular unit for a plurality of displaceable cam parts containing cylinder valves to be actuated.

To prevent soiling of the camshaft in particular, at least the mating surfaces of the cam parts and possibly the bearing ring are preferably in finished form when these parts are attached to the already finished shaft base body. Both the quality of the joining process and the initial quality of the camshaft are increased in this manner.

According to an advantageous embodiment example, the shaft base body has, at least on sections having axially displaceable cam parts, a conically expanding longitudinal profile, and the at least one secured cam part is secured on the outside circumference thereof, and the axially displaceable cam part forms a positive lock with the shaft base body in the circumferential direction by means of an internal profile corresponding to the longitudinal profile. To this end, a single longitudinal profile is advantageously attached, rolled for example, to the shaft base body so that said profile has a continuous gradient. In this case the longitudinal profile can be a longitudinal toothing.

Alternatively, it can be provided that graduated longitudinal toothing areas of increasing diameter, each diameter constant across an area of longitudinal toothing, are installed into the shaft base body to serve as the individual receiving areas of the axially displaceable cam parts. Flat mating surfaces for the secured cam parts can be provided on the shaft base body, whereas for a continuous longitudinal profile, the cam parts can be secured on the outside diameter of the conical longitudinal profile.

The securing of the cam parts is preferably accomplished in the form of a pressing process, wherein each cam part is pressed onto the press surface of the shaft base body by means of an axial movement. To this end, the internal profile of the cam part can have a constant diameter across its axial length, so that a partially plastic deformation of the longitudinal profile will take place in the prescribed manner when the cam part is secured on the conical longitudinal profile.

The gradient of the cone is adjusted such that an internal profile of the axially displaceable cam part can be configured with a constant diameter across its axial course while retaining sufficient profile overlap with the longitudinal profile in the rotational direction during an axial displacement to shut down a cylinder. A gradient of the cone of the longitudinal profile between 0.01 and 0.001 has been proven advantageous.

In another advantageous embodiment of a camshaft, it can be provided that the shaft base body has a plurality of longitudinal profile sections of identical outside diameter, wherein the at least one axially displaceable cam part is secured to one longitudinal profile section and at least one secured cam part is secured to another longitudinal profile section by means of an intermediate sleeve, which has radial play to the longitudinal sections and a larger outside diameter than an inside diameter of the cam part. All longitudinal profile sections are advantageously configured with an identical diameter so that the shaft base body is easy to produce and both the secured and also the axially displaceable cam parts are identical parts.

The intermediate sleeve is first advantageously attached to the longitudinal section predetermined for the joining process and then one or a plurality of cam parts and possibly a bearing ring and/or at least another assembly part is secured between these cam parts by a pressing process. To this end, it can be provided that the intermediate sleeve is pressed radially to the longitudinal profile section during the joining process. Material from the intermediate sleeve can be pushed into notches of the longitudinal profile section, like tooth spaces of a longitudinal toothing. The inside perimeter of the intermediate sleeve can accordingly be configured circular. Alternatively, the intermediate sleeve can have an internal profile that is complementary to the longitudinal profile sections. The longitudinal profile and the internal profile that may possibly be provided in the intermediate sleeve is preferably a longitudinal toothing. The outside surface of the intermediate sleeve and an inside surface of the secured cam parts can be finely machined, cut for example. To improve the joining process, these surfaces can be provided ground and/or with corresponding chamfers or other centering and insertion means to attach the cam parts to the intermediate sleeve.

According to the inventive idea, another advantageous embodiment can contain a shaft base body that has receiving areas having outside and inside diameters for the cam parts, wherein the at least one axially displaceable cam part is received on a longitudinal toothing provided on the outside diameter, at least one cam part is secured to the inside diameter and the secured cam parts and the receiving areas having the longitudinal profile demonstrate radial clearances that are complementary to one another and distributed across the circumference. According to this embodiment, the longitudinal profile for the axially displaceable cam parts is arranged on a larger diameter than the receiving areas for the secured cam parts. In order to bring this into a mating position surrounded by two axially elastic cam parts, the longitudinal profile has radial indents or recesses, which are distributed across the circumference and extend along the longitudinal profile so that the radial material portions, which are provided on the cam part to be secured and complementary to the notches formed by the clearances and remaining through the clearances made on the cam part, can be brought axially across the longitudinal profile. These material portions form internal circumferential segments that have a press surface and form a press fit with a press surface prepared on the inside diameter of the shaft base body at the mating position. The press surface on the inside diameter can be at least slightly elevated relative to a surrounding diameter of the shaft base body. A bearing surface can be joined to the shaft base body, or a bearing ring can be secured, by press fit for example, between two axially spaced, secured cam parts which are provided with cams for the same cylinder.

Another advantageous embodiment can provide a camshaft whose shaft base body has receiving areas for the at least one secured cam part and for at least one sleeve part having a longitudinal profile provided on its outside diameter. This embodiment is understood to include the configuration of the shaft base body in such a manner that receiving areas preferably configured with the same diameter are provided for the secured and the axially displaceable cam parts and are fine-machined, especially ground. To this end, the cam parts are secured directly on the receiving areas, whereas on the receiving areas for the axially displaceable cam parts, sleeve parts are secured to the receiving surfaces, which extend across the longitudinal profile, like longitudinal toothing, which receives the axially displaceable cam parts in a rotationally fixed and axially displaceable manner by means of a complementary internal profile like internal toothing. The inside surfaces of the secured cams, the assembly parts that may possibly be additionally provided, and/or the sleeve parts can be finished circular, especially by grinding.

This embodiment example has the special advantage that only the sleeve parts and the associated axially displaceable cam parts must be configured wear-resistant, whereas the shaft base body can be made of conventional steel. The secured cam parts have to be configured wear-resistant only on the running surfaces of the cams. The same applies to the possibly provided raceways. In this manner, the material composition of the shaft base body and the secured cam parts can be adapted primarily to the joining process.

The sleeve parts and the axially displaceable cam parts are implemented wear-resistant because of the high load on the longitudinal profile and the internal profile. They can for example be made of nitro-steel and accordingly be nitrided or carbonitrided. Selective hardening of the longitudinal profile or internal profile and of the cam raceways can also be advantageous. Other surface treatment can be provided alternatively or additionally.

As mentioned, it is not necessary to place any special requirements on the shaft base body. It can be made of non-alloyed steel like ST20 and better or also of low-alloyed steel in order to achieve better corrosion resistance for example. The shaft base body can be made of solid material or of tubular material. An implementation out of tubular material in particular permits substantial weight saving, especially when configuring a plurality of camshafts in the proposed manner.

The object of the invention is furthermore solved by a method for manufacturing a completed camshaft comprising a shaft base body, at least one cam part arranged axially displaceable on the shaft base body and at least one cam part arranged axially fixed on the shaft base body by at least the following processing steps: manufacturing the shaft base body in finished form; manufacturing the cam parts and possibly additionally provided assembly parts in finished form at least on the diameter of joint; installation of a longitudinal profile for rotationally fixed reception of the at least one axially displaceable cam part; attachment of at least one receiving surface for the axially fixed cam part between the shaft end piece and an axially displaceable cam part; installation of at least one axially fixed cam part by axially traversing an area of the longitudinal toothing of an axially displaceable cam part; securing the at least one axially fixed cam part; sliding the at least one axially displaceable cam part onto the longitudinal profile.

"Parts finished at least on the diameter of joint" is understood to mean all forming methods, including the necessary cleaning, so that the parts are already provided in a form that meets the residual-dirt requirements for the assembly and joining process. To this end the method provides for method steps that prepare openings in the cam parts, these openings being of a larger or equal diameter than the area of the longitudinal profile to be traversed. To this end, the method adapts the dimensions of conventional methods for forming a press fit. It is understood that the cam parts, the assembly parts possibly additionally provided, a shaft end piece and/or the shaft base body can be completely finished before the joining process.

For the embodiment of a camshaft having a conically increasing shaft profile, the method provides for installation of a corresponding longitudinal profile, such as a longitudinal toothing, preferably by rolling. A longitudinal profile configured in stepped form can be provided by partial rolling on different diameters.

To create a shaft base body and cam parts having clearances that are complementary to one another, methods for cutting the shaft base body and hot or cold forming and/or stamping methods are preferably used.

The method can furthermore provide for the manufacture and processing of intermediate sleeves that traverse across the area of the longitudinal toothing with play, wherein the cam part is secured to the intermediate sleeve and a press fit is formed between the shaft base body and intermediate sleeve on the one side and between the cam part and intermediate part on the other side.

The object is furthermore solved by a method for manufacturing a completed camshaft comprising a shaft base body, at least one cam part arranged axially displaceable on the shaft base body and at least one cam part arranged axially fixed on the shaft base body by means of at least the following processing steps: manufacturing the shaft base body having a plurality of fine-machined, especially ground, receiving areas: manufacturing the at least one cam part with fine-machined, especially ground, inside surfaces; manufacturing the at least one sleeve part with fine-machined, especially ground, inside surfaces and a longitudinal profile attached to its outside circumference; stringing axially displaceable cam parts and at least one axially fixed cam part upon the at least one sleeve part in the designated number and sequence; securing the at least one axially fixed cam part and the at least one sleeve part.

The manufacture of the sleeve parts is preferably performed in a wear-resistant form compared to the shaft base body. To this end, nitro-steel can be used for the sleeve parts. Alternatively or in addition, a surface treatment of the sleeve parts, such as nitriding, carbonitriding and/or a form of surface treatment can be provided.

The method for securing the single components like cam parts, sleeve parts and/or additionally provided assembly parts can provide for alignment of the parts to be secured in the circumferential and in the axial direction relative to the shaft base body, wherein an axial displacement of the press surfaces toward one another produces a press fit between the press surfaces of the shaft base body and the parts to be secured, wherein the part to be secured can be flared funnel-shaped in the press direction or can possess a chamfer. To this end, the press surface of the shaft base body can be fine-machined circularly, especially ground. Alternatively or in addition, press surfaces may be provided, each of which is made out of a plurality of axially consecutive, axially spaced surrounding rings which are radially elevated across the remaining outside diameter of the shaft base body.

The different embodiments of camshafts and their methods of manufacture can be combined with one another. Advantageous characteristics and detailed illustrations in one embodiment example or one manufacturing method can also be transferred to the other embodiment examples and manufacturing methods. Moreover, manufacturing characteristics described under the embodiment examples and device characteristics described under the manufacturing methods can be exchanged for one another.

BRIEF DESCRIPTION OF THE DRAWINGS

The invention will be explained in further detail with reference to preferred embodiments illustrated in the accompanying drawing figures, in which.

DETAILED DESCRIPTION OF PREFERRED EMBODIMENTS

Figure 1:
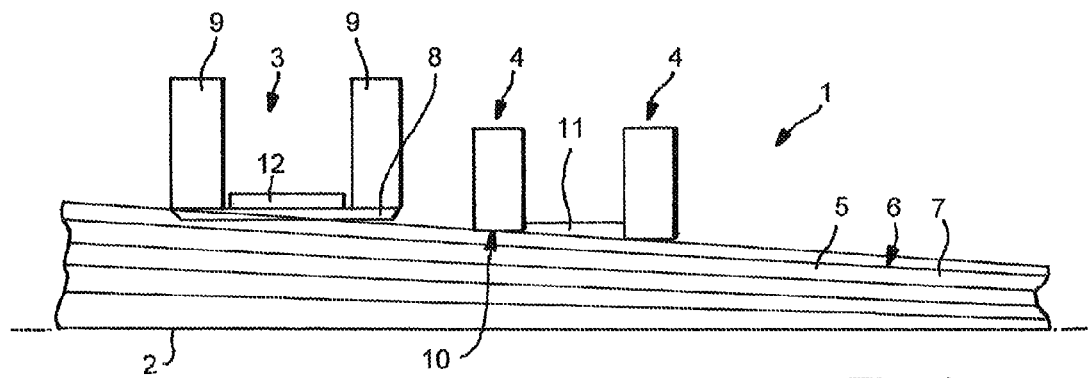
FIG. 1 shows a schematically illustrated section of a camshaft.

The camshafts 1, 1a, 1c, 1d of FIGS. 1 to 4 are each arranged around the rotational axis 2. Therefore, only the upper half is illustrated. The illustration is not true to scale. For example, details that are difficult to resolve, such as minor changes in graduations, diameters and the like, are illustrated in exaggerated form. The arrangement of the axially displaceable cam parts and the secured cam parts 4, 4a, 4b, 4c is illustrated arbitrarily. The adjacent drawing of an axially displaceable cam part 3 and a secured cam part 4, 4a, 4b, 4c is provided exclusively for explanation of the invention. In other embodiments, the number and arrangement of the cam parts can vary depending the position of the cylinder to be shut down and the number of valves per cylinder and thus the number and configuration of the cam parts and the number of cylinders controlled by the camshaft 1, 1a, 1b, 1c.

FIG. 1 depicts a section of the completed camshaft 1 without the associated terminations, such as a shaft end piece to its drive. The one-piece shaft base body 5 is configured conical and has a conical longitudinal profile 6 in the form of a longitudinal toothing 7. The internal profile 8 like internal toothing of the longitudinal toothing 7 receives the axially displaceable cam part 3 in a rotationally fixed manner. In the example of an internal combustion engine having four valves per cylinder, two cams 9, each of which acts on one valve, are provided on the internal profile 8. Depending on the embodiment of the inlet or outlet camshafts, the cams 9 selectively shut down the outlet or inlet valves of the internal combustion engine. To this end, a control device, which is not illustrated, performs the axial displacement of the axially displaceable cam part 3, wherein appropriate control elements (not shown) like circumferential grooves are provided on the cam part 3.

The overlap area of internal profile 8 and longitudinal profile 6 will vary during an axial displacement of the cam part 3 because of the conical configuration of the longitudinal profile 6. The gradient of the longitudinal profile is however configured such that the necessary torque can be transmitted with appropriate reliability. Gradients between 0.001 and 0.01 have proven advantageous for this.

The cam parts 4 for shutting down an (in this case) adjacent cylinder are secured on the outside diameter of the longitudinal profile 6. In this case, as depicted in FIG. 1, it is possible to adjust the inside surface 10 of the cams conically and to the gradient of the longitudinal profile 6. In another advantageous embodiment example, the inside surface can be configured with a constant diameter so that the longitudinal profile 6 is easily plastically deformed to the larger diameter when the cam parts 4 are secured. In the depicted embodiment example, two cam parts 4 are secured axially spaced apart to actuate two valves on the same cylinder. A bearing ring 11 having a conical inside surface or an inside surface with uniform inside diameter corresponding to the cam parts previously described can be secured between the two cam parts 4. A bearing ring 12 can be provided between the cams 9 of the cam part 3 in a corresponding manner, wherein the axial displacement can occur across a bearing with axial play.

The conical embodiment of the shaft base body 5 makes it possible to mount or secure the individual cam parts 3, 4 and other cam parts in correspondence with the desired arrangement. In the depicted embodiment example, the axially displaceable cam part 3 is first mounted on the longitudinal profile 6, and the cam parts 4 and the bearing ring 11 are then secured by means of a pressing process, for example. Other cam parts 3, 4, which are provided with appropriately smaller inside diameters, can be mounted or secured in an axially adjacent manner.

Figure 2:
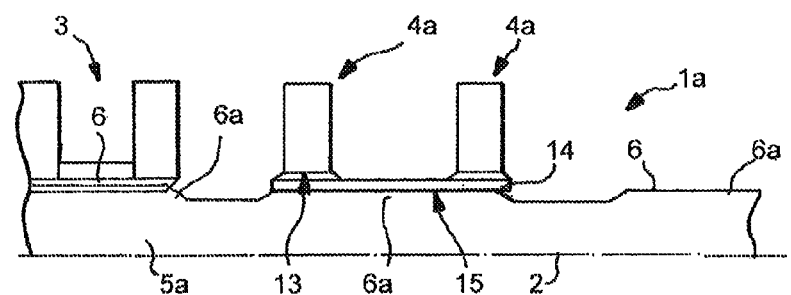
FIG. 2 shows a schematically illustrated section of a camshaft similar to the camshaft shown in FIG. 1.

FIG. 2 depicts a camshaft 1a that has been altered in relation to camshaft 1 of FIG. 1, having receiving areas 6a which have a longitudinal profile 6 and a constant diameter across the axial course of the shaft base body 5a. The manufacture of the shaft base body 5a is insofar easier and less expensive since the receiving areas 6a are easier to prepare.

The axially displaceable cam parts 3 can be pushed across the uniformly configured receiving areas 6a up to the desired receiving area. The cam parts 4a have an opening 13, the inside diameter of which is larger than the outside diameter of the receiving areas 6a, so that they can be pushed over them in an easy manner. The cam parts 4a are secured on the corresponding receiving area 6a by means of an intermediate sleeve 14. For this, the inside diameter 15 of the intermediate sleeve is configured such that the intermediate sleeve can be axially pushed across the required receiving areas 6a to the desired position of the cam parts 4a to be secured. The cam parts 4a are pushed onto the intermediate sleeve 14 in the subsequent joining process, wherein they become plastically deformed in the clearances of the longitudinal profile 6, in the tooth spaces of a longitudinal toothing for example, and produce a rotational connection and an axial alignment between the cam parts 4a, which are secured on the intermediate sleeve 14 by means of a press fit, and the shaft base body 5a. For this the intermediate sleeve can be machined circular internally, by grinding for example. Alternatively, the intermediate sleeve 14 can have an internal profile, like internal toothing, complementary to the longitudinal profile 6.

Figure 3:
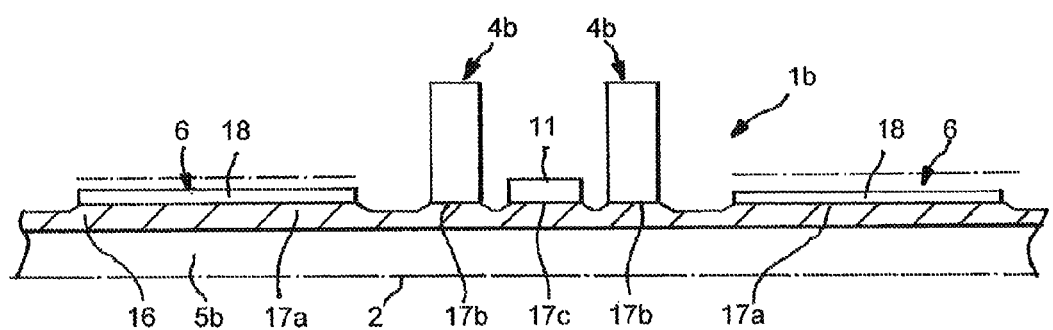
FIG. 3 shows a schematically illustrated section of a camshaft similar to the camshafts shown in FIGS. 1 and 2.

As an alternative to the camshafts 1, 1a of FIGS. 1 and 2, FIG. 3 depicts a camshaft 1b comprising a shaft base body 5b made of a tubular section 16. Alternatively, the shaft base body 5b can also be made of solid material. In contrast to the camshafts 1, 1a of FIGS. 1 and 2, a longitudinal profile is not provided in the shaft base body 5b. Rather, receiving areas 17a, 17b, 17c for sleeve parts 18, the cam parts 4b and a possibly present bearing ring 11 are provided on the same diameter and are axially and rotationally fixed by means of a joining process, such as by producing a press fit by axial pressing on the receiving areas 17a, 17b, 17c for example. To this end, the sleeve parts 18 have a longitudinal profile 6 upon which the unillustrated axially displaceable cam parts, which can correspond to the cam parts 3 of FIGS. 1 and 2, are mounted. To this end the sleeve parts 18, cam parts 4b and bearing rings 11 are secured, depending on the desired arrangement, wherein the sleeve parts 18 already contain the axial cam parts during the joining process.

The embodiment example of the camshaft 1b depicted in FIG. 3 depicts a simple and inexpensive production process in which the shaft base body 5b can be made of steel, which is adapted only to the required strength and the proposed joining process. Non-alloyed steels like ST20 are suitable, for example, since the longitudinal profiles 6, which are subject to wear, must be provided on the sleeve parts. The use of a tubular section also saves weight. By moving the longitudinal profile 6 into the sleeve parts 18, the necessary wear protection corresponding to the requirement on longitudinal profile 6 is restricted to the sleeve parts 18, which have little weight in comparison to the dimension of the shaft base body 5b and can therefore be made out of expensive nitro-steel, for example, and can in a simple manner also be inexpensively nitrided, carbonitrided or surface treated in another manner in correspondence with their small size. It is self-understood that in all embodiment examples, the axially displaceable cam parts have adequate wear protection because their internal profile stands in positive lock with the longitudinal profile.

As an alternative to the camshafts 1, 1a, 1b of FIGS. 1 to 3, FIG. 4 depicts an embodiment of the camshaft 1c in which the unillustrated, secured cam parts are secured to a receiving area 6c, which has a smaller diameter D(i) than the outside diameter D(a) of the longitudinal profile 6. To achieve an independent positioning of the axially displaceable cam parts, which are received on the longitudinal profile 6, and of the secured cam parts, the shaft base body 5c has clearances 19 in the vicinity of the longitudinal profile 6, as evident in FIG. 5, which depicts the camshaft 1c in the cross section A-A of FIG. 4. In the embodiment example of FIGS. 4 and 5, the clearances 19 are configured as three notches distributed across the circumference so that the longitudinal profile 6, which receives the axially displaceable cam parts, retains three circular segments 20, which have the outside diameter D(a). In the vicinity of the receiving areas 6b, the clearances 19 are limited to the diameter D(i) in the radially inward direction, whereas an even smaller diameter D(w) for the shaft base body 5c is provided adjacent to the receiving areas.

Figure 4:
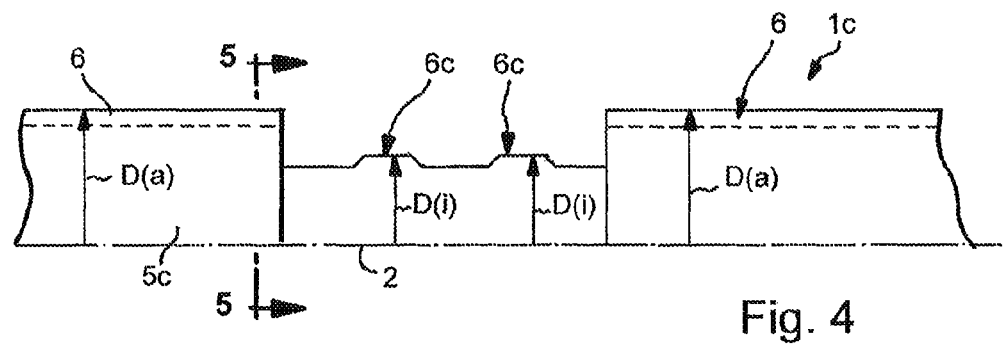
FIG. 4 shows a schematically illustrated section of a camshaft similar to the camshafts shown in FIGS. 1 to 3.
Figure 5:
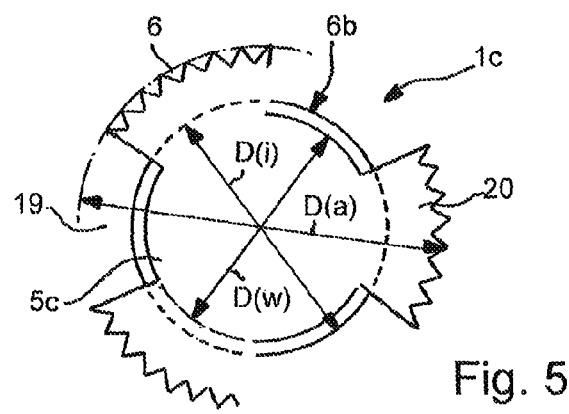
FIG. 5 shows a transverse sectional view of the camshaft shown in FIG. 4.
Figure 6:
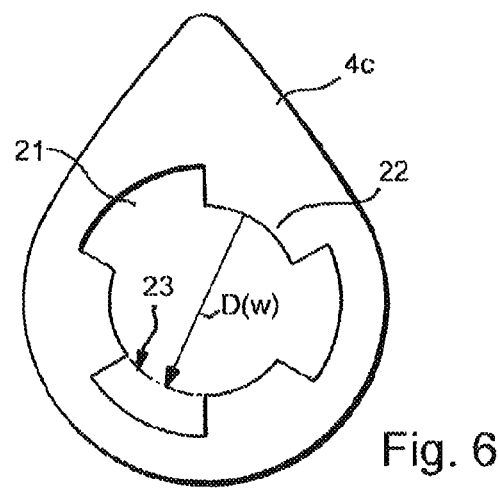
FIG. 6 shows a view of a cam part to be attached to the camshaft of FIGS. 4 and 5.

In FIG. 6, the cam parts 4c to be secured have clearances 21 which are complementary to the clearances 19 of the shaft base body 5c of FIG. 5 and guide the circular segments 21 of the shaft base body 5c during the positioning of the cam part 4c. To this end, the remaining circular segments 22 of the cam part 4c are guided by the clearances 19 of the shaft base body 5c, and on their internal circumference they demonstrate press surfaces 23, which are finished, such as ground, and have a diameter D(n), which is slightly smaller than the diameter D(i) (FIG. 4) in order to produce a press fit with the receiving area 6c (FIG. 4).

The claims submitted with the application are wording suggestions without prejudice for the achievement of further patent protection. The applicant reserves the right to claim still more combinations of characteristics that have so far been disclosed only in the description and/or drawings. Back references used in dependent claims refer to the further development of the subject matter of the main claim by the characteristics of the respective dependent claim; they are not to be understood as a waiver on the achievement of an independent, concrete protection for the combination of characteristics of the claims to which they refer. Since the subject matters of the dependent claims can form their own independent inventions in regard to the prior art on the priority date, the applicant reserves the right to make them the subject matter of independent claims or declarations of division. They can furthermore also contain independent inventions that have a structure independent of the subject matters of the preceding dependent claims.

The embodiment examples are not to be understood as limiting the invention. Rather, numerous alterations and modifications in conjunction with the present disclosure are possible, especially such variants, elements and combinations and/or materials that a person skilled in the art can derive in reference to the solution of the object, such as by combining or modifying individual characteristics or elements or method steps described in the general description and embodiments and claims and included in the drawings, and that lead to a novel subject matter or to novel method steps or method step sequences by combining characteristics, and also to the extent that they affect manufacturing, testing and operating processes.

One possible wording of the claims is the following: camshaft, particularly for use in an internal combustion engine, having a rotatably mounted shaft base body and a plurality of cam parts, each having an opening for its reception on the shaft base body, wherein at least one cam part is received so as to be rotationally fixed and axially displaceable on a longitudinal profile, characterized in that at least one cam part that is to be arranged axially fixed during assembly is pushed along the shaft base body across at least one receiving area for an axially displaceable cam part and then secured. A first configuration of the camshaft, characterized in that a bearing ring is secured axially between two cam pieces arranged in an axially fixed manner.

A second configuration of the camshaft, possibly according to the first configuration, characterized in that the cam parts and possibly the bearing ring are attached finished to the finished shaft base body.

A third configuration of the camshaft, possibly according to the first and/or second configuration, characterized in that the shaft base body has, at least on sections having axially displaceable cam parts, a conically expanding longitudinal profile, and the at least one secured cam part is secured on the outside circumference thereof, and the axially displaceable cam part forms a positive lock with the shaft base body in the circumferential direction by means of an internal profile corresponding to the longitudinal profile.

A fourth configuration of the camshaft, possibly according to the third configuration, characterized in that the joining process is a pressing process.

A fifth configuration of the camshaft, possibly according to the third and/or the fourth configuration, characterized in that the longitudinal profile of the shaft base body and the corresponding internal profile are a longitudinal toothing.

A sixth configuration of the camshaft, possibly according to one of the third to fifth configurations, characterized in that the internal profile has a constant diameter across its axial length.

A seventh configuration of the camshaft, possibly according to one of the third to sixth configurations, characterized in that a gradient of the cone is between 0.01 and 0.001.

An eighth configuration of the camshaft, possibly according to the seventh configuration, characterized in that the inside surface of the secured cam parts has a constant diameter across its axial length.

A ninth configuration of the camshaft, characterized in that the shaft base body has a plurality of receiving areas having a longitudinal profile of identical outside diameter, wherein the at least one axially displaceable cam part is secured to one receiving area and at least one secured cam part is secured to another receiving area by means of an intermediate sleeve, which has radial play to the receiving areas and a larger outside diameter than an inside diameter of the cam part.

A tenth configuration of the camshaft, possibly according to the eighth and/or ninth configuration, characterized in that the intermediate sleeve is pressed radially to the receiving area during the joining process.

An eleventh configuration of the camshaft, possibly according to one of the eighth to tenth configurations, characterized in that the internal circumference of the intermediate sleeve is circular.

A twelfth configuration of the camshaft, possibly according to one of the eighth to eleventh configurations, characterized in that the intermediate sleeve has an internal profile complimentary to the longitudinal profiles.

A thirteenth configuration of the camshaft, possibly according to the eleventh configuration, characterized in that the longitudinal profile and the internal profile are longitudinal toothings.

A fourteenth configuration of the camshaft, possibly according to one of the eighth to thirteenth configurations, characterized in that an outside surface of the intermediate sleeve and an inside surface of the secured cam parts are fine-machined, especially ground.

A fifteenth configuration of the camshaft, possibly according to the first or second configuration, characterized in that the shaft base body has receiving areas with an outside and an inside diameter, D(a), for the cam parts, wherein the at least one axially displaceable cam part is received on a longitudinal profile provided on the outside diameter, at least one cam part is secured on the inside diameter and the secured cam parts and the receiving areas having the longitudinal profile have radial clearances, which are distributed over the circumference and complementary to one another.

A sixteenth configuration of the camshaft, possibly according to the fifteenth configuration, characterized in that the secured cam parts form a press fit with a press surface on the inside diameter by means of remaining circular segments.

A seventeenth configuration of the camshaft, possibly according to the fifteenth or sixteenth configuration, characterized in that a diameter provided on the shaft base body is reduced relative to the inside diameter.

An eighteenth configuration of the camshaft, possibly according to the first or second configuration, characterized in that the shaft base body has receiving areas for the at least one secured cam part and for at least one sleeve part provided with a longitudinal profile on its outside diameter.

A nineteenth configuration of the camshaft, possibly according to the eighteenth configuration, characterized in that the receiving areas for the at least one secured cam part and/or for the sleeve part are fine-machined, especially ground.

A twentieth configuration of the camshaft, possibly according to the eighteenth or nineteenth configuration, characterized in that the inside surface of the at least one sleeve part is ground circular.

A twenty-first configuration of the camshaft, possibly according to one of the eighteenth to twentieth configurations, characterized in that the inside surface of the opening of the secured cam parts is ground circular.

A twenty-second configuration of the camshaft, possibly according to one of the eighteenth to twenty-first configurations, characterized in that the at least one sleeve part and/or possibly the bearing ring are secured on the receiving areas.

A twenty-third configuration of the camshaft, possibly according to the twenty-second configuration, characterized in that the at least one sleeve part, the secured cam parts and/or possibly the bearing ring are pressed onto the receiving areas.

A twenty-fourth configuration of the camshaft, possibly according to one of the eighteenth to twenty-third configurations, characterized in that the receiving areas are provided on the identical outside diameter.

A twenty-fifth configuration of the camshaft, possibly according to one of the eighteenth to twenty-fourth configurations, characterized in that the at least one sleeve part is configured wear-resistant.

A twenty-sixth configuration of the camshaft, possibly according to the twenty-fifth configuration, characterized in that the at least one sleeve part is made of nitro-steel.

A twenty-seventh configuration of the camshaft, possibly according to one of the twenty-fifth or twenty-sixth configurations, characterized in that the at least one sleeve part is surface-treated.

A twenty-eighth configuration of the camshaft, possibly according to one of the eighteenth to twenty-seventh configurations, characterized in that the shaft base body is made of non-alloyed or low-alloyed steel.

A twenty-ninth configuration of the camshaft, possibly according to one of the preceding configurations, characterized in that the shaft base body is made of a tubular section.

A thirtieth configuration of the camshaft, possibly according to one of the eighteenth to twenty-ninth configurations, characterized in that the at least one axially displaceable cam part is received on the longitudinal profile of the at least one sleeve part so as to be rotationally fixed and axially displaceable.

A thirty-first configuration of the camshaft according to one of the preceding configurations, characterized in that the at least one axially displaceable cam part is formed out of two cams axially spaced apart from one another and an internal profile configured common to both cams and complementary to the longitudinal profile.

A thirty-second configuration of the camshaft according to one of the preceding configurations, characterized in that at least one other assembly part is provided on the camshaft.

A first configuration of the method for manufacturing a completed camshaft comprising a shaft base body, at least one cam part arranged axially displaceable on the shaft base body and at least one cam part arranged axially fixed on the shaft base body, characterized by at least the following processing steps: manufacturing the shaft base body in finished form; manufacturing the cam parts and possibly an additionally provided assembly part in finished form at least on the diameter of joint; installation of a longitudinal profile for rotationally fixed reception of the at least one axially displaceable cam part; attachment of at least one receiving surface for the axially fixed cam part; installation of at least one axially fixed cam part by axially traversing an area of the longitudinal profile of an axially displaceable cam part; securing the at least one axially fixed cam part; sliding the at least one axially displaceable cam part onto the longitudinal profile.

A second configuration of the method according to the first configuration, characterized by a provision of openings in the cam parts, wherein these openings are of a larger or equal diameter than the area of the longitudinal profile to be traversed.

A third configuration of the method according to the first or second configuration, characterized by manufacture of a longitudinal profile that increases conically or in steps.

A fourth configuration of the method possibly according to the first configuration, characterized by a provision of openings in the cam parts having radially expanded notches distributed over the circumference and, in the longitudinal profile of the area to be traversed, radial indents complementary to said notches.

A fifth configuration of the method possibly according to the first configuration, characterized by intermediate sleeves, which traverse the area of the longitudinal profile with play, wherein the cam part is secured on the intermediate sleeve and a press fit is formed between the shaft base body and intermediate sleeve on the one side and between the cam part and intermediate part on the other side.

An alternative or supplementary first configuration to the first configuration of the method for manufacturing a completed camshaft comprising a shaft base body, at least one cam part arranged axially displaceable on the shaft base body and at least one cam part arranged axially fixed on the shaft base body, characterized by at least the following processing steps: manufacturing the shaft base body with a plurality of fine-machined, especially ground, inside surfaces; manufacturing the at least one cam part with fine-machined, especially ground, inside surfaces; manufacturing the at least one sleeve part with fine-machined, especially ground, inside surfaces and a longitudinal profile attached to its outside circumference; stringing axially displaceable cam parts and at least one axially fixed cam part upon the at least one sleeve part in the designated number and sequence; securing the at least one axially fixed cam part and the at least one sleeve part.

A second configuration to the alternative or supplementary first configuration characterized by manufacturing the at least one sleeve part wear-resistant compared to the shaft base body.

A third configuration to the second configuration to the alternative or supplementary first configuration, characterized by use of nitro-steel for the at least one sleeve part.

A fourth configuration to the second or third configuration to the alternative or supplementary first configuration, characterized by surface treatment of the at least one sleeve part.

A fifth configuration possibly to one of the first to fourth configurations to the alternative or supplementary first configuration, characterized by nitriding or carbonitriding of the at least one sleeve part.

Another configuration to one of the preceding configurations of the method, characterized by a joining process in which an alignment of the parts to be secured takes place in the circumferential and in the axial direction relative to the shaft base body, and an axial displacement of the press surfaces toward one another produces a press fit between the press surfaces of the shaft base body and the parts to be secured, wherein the part to be secured is flared funnel-shaped in the press direction or possesses a chamfer.

Another configuration to one of the preceding configurations of the method is characterized in that the press surface of the shaft base body is fine-machined circular, especially ground.

Another configuration to one of the preceding configurations of the method is characterized in that the press surface of the shaft base body is made out of a plurality of axially consecutive, axially spaced surrounding rings which are radially elevated across the remaining outside diameter of the shaft base body.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

The invention claimed is:

1. A camshaft for use in an internal combustion engine, having a rotatably mounted shaft base body and a plurality of cam parts, each having an opening for its reception on the shaft base body, the shaft base body having a longitudinal profile, wherein at least one cam part is received so as to be rotationally fixed and axially displaceable on the longitudinal profile of the shaft base body, the at least one axially displaceable cam part forms a positive lock with the shaft base body in a circumferential direction with an internal profile corresponding to the longitudinal profile of the shaft base body, at least one cam part being axially secured on an outside circumference of the shaft base body, and the at least one cam part that is to be arranged axially fixed during assembly is pushed along the shaft base body across at least one receiving area for an axially displaceable cam part and then secured.

2. The camshaft according to claim 1, wherein the longitudinal profile of the shaft base body has a conically expanding longitudinal profile.

3. The camshaft according to claim 1, characterized in that the shaft base body has a plurality of receiving areas having a longitudinal profile of identical outside diameter, wherein the at least one axially displaceable cam part is secured to one receiving area and at least one secured cam part is secured to another receiving area by means of an intermediate sleeve, which has radial play to the receiving areas and a larger outside diameter than an inside diameter of the cam part.

4. The camshaft according to claim 1, characterized in that the shaft base body has receiving areas for the at least one secured cam part and for at least one sleeve part provided with a longitudinal profile on its outside diameter.

5. The camshaft according to claim 4, characterized in that the receiving areas are provided on the identical outside diameter.

6. The camshaft according to claim 1, characterized in that the at least one axially displaceable cam part is formed out of two cams axially spaced apart from one another.

* * * * *